J. F. O'CONNOR.
FRICTION SHOCK ABSORBING MECHANISM.
APPLICATION FILED JUNE 6, 1919.
1,364,511.
Patented Jan. 4, 1921.
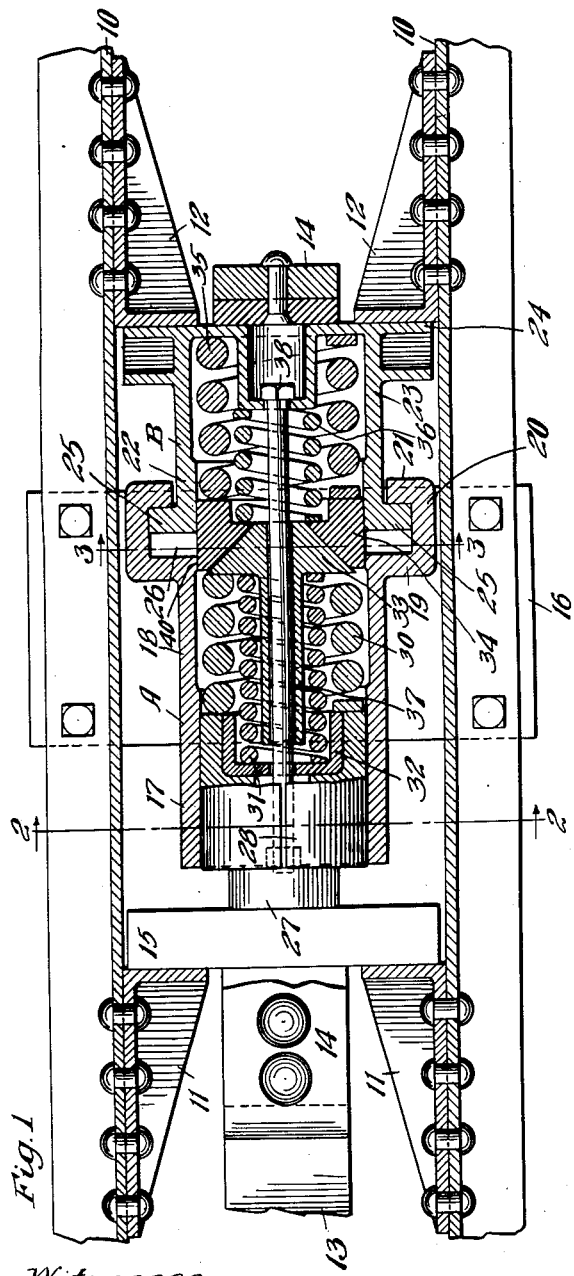
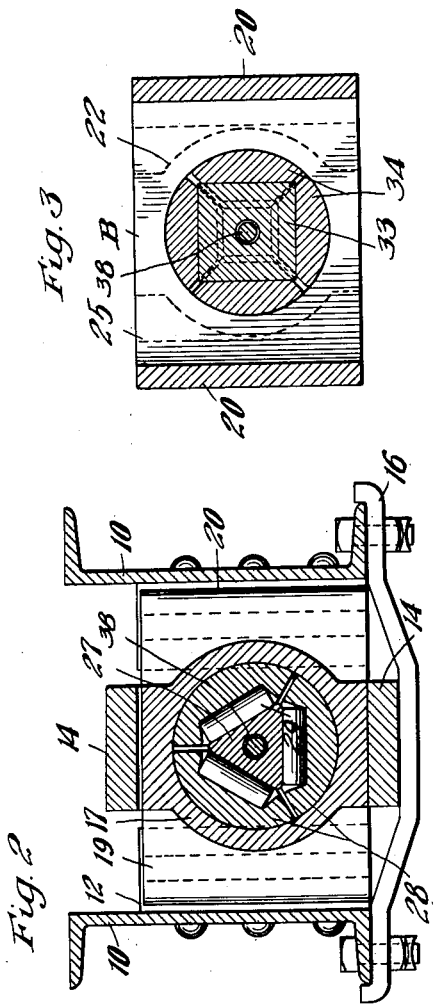
Witnesses
Wm. Geiger
Inventor
John F. O'Connor
By Geo. I. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,364,511.     Specification of Letters Patent.     Patented Jan. 4, 1921.

Application filed June 6, 1919. Serial No. 302,258.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein is obtained high capacity and graduated release.

Another object of the invention is to provide a friction shock absorbing mechanism of the character above indicated wherein is obtained a preliminary spring action and a subsequent friction action of high capacity.

In the drawings forming a part of this specification, Figure 1 is a horizontal, sectional view of a portion of a railway draft rigging showing my improvements in connection therewith. Fig. 2 is a vertical, transverse, sectional view taken substantially on the line 2—2 of Fig. 1. And Fig. 3 is a vertical, transverse, sectional view taken substantially on the line 3—3 of Fig. 1.

In said drawing, 10—10 denote channel-shaped center or draft sills of a railway car to the inner sides of which are secured front lugs 11 and rear lugs 12. The draw bar is indicated at 13 and the same may be operatively united with the shock absorbing mechanism proper by any suitable means such as the yoke 14. A front follower 15 is preferably interposed between the draw bar and the shock absorbing mechanism. The parts are shown as supported by a detachable saddle plate 16 of well known form.

The improved shock absorbing mechanism proper, as shown, comprises, an outer combined friction shell and spring casing A, an inner combined friction shell and spring casing B, an outer set of friction elements hereinafter detailed, and an inner set of friction elements coöperable with the shell B, hereinafter detailed. With each shell A and B is also associated a spring resistance in the manner to be specified.

The shell A is preferably of cylindrical form throughout the greater part of its length and provides a friction shell proper 17 at its outer end and a spring casing 18 rearwardly thereof. Said member A is open at both ends and at its inner end is provided with laterally extended flanges 19—19, the latter in turn being rearwardly extended as indicated at 20—20 and formed with inturned flanges 21. The member B is formed with a friction shell proper 22 at its outer end and rearwardly thereof with a spring casing 23. Preferably, the member B is formed with an integral rear wall and lateral extensions indicated at 24 so that the same may act as a rear follower. At its forward end, the member B is provided with laterally extended flanges 25 which fit within the hook-shaped extensions of the member A. It will be noted that a clearance is normally provided as indicated at 26 between the outer face of the shell B and the inner end of the member A so as to permit a limited amount of relative movement between the members A and B. Manifestly, the overlapping flanges 21 and 25 of the two members A and B will limit the separating movement thereof.

The friction devices coöperable with the member A preferably comprise an outer wedge 27, a circularly arranged series of friction shoes 28, and a plurality of anti-friction rollers 29 interposed between the wedge and the shoes. Within the member A is disposed a spring comprising an outer heavy coil 30 and an inner lighter coil 31, the outer coil passing directly on the inner ends of the shoes 28 and the inner coil bearing on a bushing 32 seated within the shoes.

The friction devices coöperable with the rear member B comprise a central wedge 33 and a series of friction shoes 34, the latter preferably numbering four and the wedge being formed with a corresponding number of wedge faces. In this set of friction devices, it will be noted that no anti-friction rollers are provided for a purpose hereinafter described. Within the member B is located a spring resistance comprising an outer heavy coil 35 and an inner lighter coil 36.

The wedge 33 is so formed as to provide a large bearing surface on its forward face so that both coils 30 and 31 of the outer spring will bear directly thereon, as shown in Fig. 1. The wedge 32 is also formed with a pressure-transmitting bar or extension 37, the outer end of which is normally spaced from the bushing 32 a distance corresponding to the permissible movement between the members A and B. A retaining bolt 38 may be employed to hold the parts in assembled relation and the springs under an initial compression.

The operation is as follows: Assuming an inward movement of the draw bar, the first resistance will be a preliminary one given by the spring within the member A, that is, the outer member A will move rearwardly relatively to the inner member B without appreciable actuation of either set of friction devices inasmuch as the friction will be greater than either spring capacity. After the member A has come into contact with the member B, the sleeve 32 will have come into contact with the extension 37 of the wedge 33 and the front spring will be substantially solid. Further inward movement of the draw bar will be frictionally resisted by the friction elements of the front set and also by the friction elements of the rear set. During this action, the rear spring will be compressed and it is evident that its resistance transmitted through the rear set of friction devices to the front set of friction devices will be greatly multiplied, thus creating a frictional resistance of unusually high capacity. In the release, the front set of friction devices will readily collapse because of the anti-friction rollers and the front spring thereby expanded. After this action, however, the further release of the device will be dampened due to the rear set of friction elements which will afford frictional resistance to the separation of the members A and B inasmuch as the wedge 33 will, of course, be under spring pressure from the front spring and the entire collapse of the rear set of friction devices thereby prevented. It will also be observed that, after the members A and B have moved toward each other the permissible amount, the friction shoes 34 of the rear set will have a continuous friction shell surface formed by both members A and B to act against, the rear end of the member A being formed with a friction shell section as indicated at 40 for this purpose.

I claim:

1. In a friction shock absorbing mechanism, the combination with two friction shells arranged in tandem and normally separated, one shell being open at both of its ends; of a set of friction elements coöperable with each friction shell; and a spring coöperable with each set of friction elements, the spring in the shell open at both of its ends coöperating with both sets of friction elements.

2. In a friction shock absorbing mechanism, the combination with an outer friction shell, friction devices and spring coöperable therewith, of an inner friction shell, friction devices and spring coöperable therewith, said shells being arranged in tandem, and the friction devices of the inner shell normally extending partially within the rear end of the outer friction shell.

3. In a friction shock absorbing mechanism, the combination with two friction shells arranged in tandem and relatively movable toward and from each other a predetermined distance, of integral means on the shells for limiting the separating movement thereof, and tandem arranged sets of friction devices, and spring means coöperable with said two shells.

4. In a friction shock absorbing mechanism, the combination with an outer friction shell, friction devices including a wedge coöperable therewith, and a spring, of an inner friction shell, friction devices including a wedge coöperable with said inner friction shell, and a spring coöperable with the last named friction devices, said shells being relatively movable, and a pressure-transmitting bar interposed between the wedge of the inner friction devices and the outer friction devices and normally separated from the latter a distance corresponding to the permissible relative movement of the shells.

5. In a friction shock absorbing mechanism, the combination with an outer friction shell, friction devices including a wedge and friction shoes coöperable therewith, and a spring mounted within the shell, of an inner friction shell, friction devices including a wedge and friction shoes coöperable with said inner friction shell, a spring mounted within said inner shell, the first named spring bearing at one end against the first named friction shoes and at its other end against the wedge of the second named set of friction devices, and pressure-transmitting means interposed between the first named friction shoes and the wedge of the second named set of friction devices.

6. In a friction shock absorbing mechanism, the combination with two friction shells relatively movable longitudinally a predetermined distance, of a spring mounted within one of said shells, friction shoes coöperable with the last named shell, a wedge coöperable with said shoes, a spring mounted within the other of said shells and bearing at one end against said wedge, friction shoes coöperable with the last named shell, a wedge coöperable with the last named friction shoes, anti-friction devices interposed between the last named wedge and friction shoes, and means for limiting the separating movement of said shells.

7. In a friction shock absorbing mechanism, the combination with an outer friction shell, of an inner friction shell, said shells having overlapping shoulders adapted to limit the separating movement thereof, of friction devices coöperable with the outer friction shell including a wedge, friction shoes and anti-friction means interposed between said wedge and shoes, friction devices coöperable with the inner friction shell including friction shoes and a wedge, a spring in the outer friction shell interposed between the shoes coöperable therewith and the wedge of the friction devices within the inner friction shell, and a spring interposed between the shoes coöperable with the inner shell and the inner end of said shell.

8. In a friction shock absorbing mechanism, the combination with two friction shells arranged in tandem and normally separated, one shell being open at both of its ends; of a set of friction elements coöperable with each friction shell; a spring coöperable with each set of friction elements, the spring in the shell open at both of its ends coöperating with both sets of friction elements; and a pressure-transmitting bar interposed between the two sets of friction elements and normally separated, at one of its ends, from one of said sets of friction elements, a predetermined distance.

In witness that I claim the foregoing I have hereunto subscribed my name this 21st day of May, 1919.

JOHN F. O'CONNOR.